United States Patent Office 3,202,675
Patented Aug. 24, 1965

3,202,675
**1-BENZYL-2,5-BIS(CHLOROMETHYL)PYRROLI-
DINE AND ACID-ADDITION SALTS THEREOF**
Noel F. Albertson, East Greenbush, N.Y., assignor to Sterling Drug Inc., New York, N.Y., a corporation of Delaware
No Drawing. Filed Oct. 26, 1961, Ser. No. 147,729
3 Claims. (Cl. 260—313)

This invention relates to novel derivatives of pyrrolidine. More particularly, the invention here is 1-benzyl-2,5-bis(chloromethyl)pyrrolidine and acid-addition salts thereof.

The 1-benzyl-2,5-bis(chloromethyl)pyrrolidine of this invention, having in the free base form the structural formula

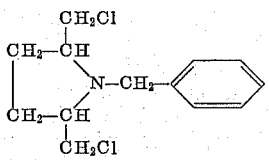

has pharmacodynamic activity, being useful for example as an adrenergic blocking agent, and is also a valuable intermediate in organic chemical syntheses.

The preparation of my new 1-benzyl-2,5-bis(chloromethyl)pyrrolidine can be carried out by treating 1-benzyl-2,5-bis(hydroxymethyl)pyrrolidine with an agent effective to replace each of the two hydroxyl groups with chlorine. Conveniently, 1-benzyl-2,5-bis(hydroxymethyl)pyrrolidine is interacted with two molecular equivalents of thionyl chloride, preferably in the presence of a suitable inert solvent medium such as anhydrous chloroform, to produce 1-benzyl-2,5-bis(chloromethyl)pyrrolidine in the form of its hydrochloride salt. The hydrochloride can be isolated as such or, if desired, can be converted to the free base form by treatment with alkali; and the free base form can be converted to any desired acid addition salt form by treatment with one equivalent of the appropriate organic or inorganic acid.

The structure of the 1-benzyl-2,5-bis(chloromethyl) pyrrolidine is established by the mode of synthesis and agreement of the found values with the calculated values in elementary analysis. My new compound can exist in geometrically isometric forms, that is, as cis and trans isomers. The production of a particular geometric form can be accomplished by application of the general principles known in the art.

My invention is illustrated by the following example without, however, being limited thereto.

Example

To an ice cold solution of 59.4 g. of cis-1-benzyl-2,5-bis(hydroxymethyl)pyrrolidine and approximately 400 ml. of chloroform there was slowly added, dropwise and with stirring, 70 g. of thionyl chloride. After addition of the thionyl chloride had been completed, the resulting solution was warmed on a steam bath for fifteen minutes. The solvent was then distilled off under reduced pressure, 675 ml. of isopropyl alcohol was added to the residue thus obtained, and the mixture was heated to boiling. The mixture was then chilled and filtered, and the solid thus collected was washed with diethyl ether and dried. There was thus obtained 65.6 g. of cis-1-benzyl-2,5-bis(chloromethyl)pyrrolidine hydrochloride as a white solid product. Another 6.0 g. crop of the same product was recovered from the mother liquor. After recrystallization from isopropyl alcohol, cis-1-benzyl-2,5-bis(chloromethyl)-pyrrolidine hydrochloride melted at approximately 163–164° C. Elementary analysis confirmed the empirical formula of the product as being $C_{13}H_{17}Cl_2N \cdot HCl$. It had low water solubility and this salt was precipitated when a 1 percent solution of it in 95 percent ethyl alcohol was diluted with four volumes of water.

For conversion to the corresponding free base, cis-1-benzyl-2,5-bis(chloromethyl)pyrrolidine hydrochloride was suspended in water, and the pH of the mixture was adjusted to approximately 10 by addition of 10 percent aqueous sodium hydroxide solution. The oily precipitate which separated from solution was extracted into diethyl ether, and when the ethereal extract was concentrated on a steam bath there was obtained cis-1-benzyl-2,5-bis(chloromethyl)pyrrolidine as a straw-colored oil. This base was insoluble in water and soluble in n-hexane. When an ethereal solution of this base was cooled in a Dry Ice-acetone bath, the base precipitated as a waxy solid which redissolved in the ether below 0° C. when the mixture was removed from the cooling bath and allowed to warm up. Treatment of the ethereal solution with acetic acid, thus forming the acetate salt of the base, did not cause formation of a precipitate. When the base was treated with ethereal hydrogen chloride solution, the base was reconverted to the hydrochloride salt. The ultraviolet spectrum of the free base showed $$\lambda^{95\% \text{ ethanol}}_{\text{maximum}} = 252 \text{ millimicrons } (\epsilon 320)$$

258 millimicrons ($\epsilon$310); 262 millicrons (shoulder) ($\epsilon$260); and 269 millimicrons ($\epsilon$165). The infra red spectrum of the free base in a potassium bromide pellet showed maxima at: 3.37 microns (s) plus shoulders at 3.25 microns (m), 3.29 microns (m), 3.42 microns (m), and 3.54 microns (m); 5.10 microns (w); 5.30 microns (w); 5.50 microns (w); 6.22 microns (m); 6.28 microns (m); 6.66 microns (ms); 6.85 microns (s); 6.90 microns (shoulder); 13.50 microns (vs); and 14.25 microns (vs).

When 59.4 g. of the trans form of 1-benzyl-2,5-bis(hydroxymethyl)pyrrolidine is substituted for the cis form in the foregoing example, the product of the reaction with thionyl chloride is trans-1-benzyl-2,5-bis(chloromethyl)-pyrrolidine hydrochloride. Treatment of this salt with alkali yields the corresponding free base, trans-1-benzyl-2,5-bis(chloromethyl)pyrrolidine.

The new compound of this invention is a highly active antagonist of epinephrine; that is, it blocks or inhibits the pressor response to epinephrine, and it is useful as an adrenergic blocking agent. For instnace, when tested intravenously in anesthetized dogs and using N-(2-chloroethyl)-N,N dibenzylamine hydrochloride, a well-known adrenolytic agent, as the reference drug, the cis-1-benzyl-2,5-bis(chloromethyl)pyrrolidine hydrochloride described hereinabove is more inhibitory than the reference drug to the pressor effect of epinephrine. Cis-1-benzyl-2,5-bis-(chloromethyl)pyrrolidine hydrochloride is also substantially less toxic than the reference drug and hence has a more favorable therapeutic index.

The compound of this invention is also highly useful as an intermediate in the synthesis of other compounds with useful pharmacological properties. In particular, it has been found that to be useful for the introduction of the bivalent radical

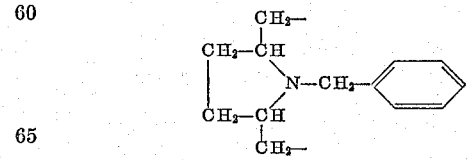

into compounds susceptible to the action of alkylating agents. For instance, such alkylation has been used to prepare compounds of the nortropane series. Thus, for example, interaction of cis-1-benzyl-2,5-bis(chloromethyl)-pyrrolidine with benzyl cyanide in the presence of sodamide, using toluene as a reaction medium, yields 3- phenyl-8-benzyl-3-nortropanecarbonitrile. Through the steps of removal of the 8-benzyl group by hydrogenolysis and conversion of the nitrile group to carbethoxy by acid hydrolysis in the presence of ethyl alcohol, in either sequence, there is obtained ethyl 3-phenyl-3-nortropanecarboxylate, which on N-methylation yields ethyl 3-phenyl-8-methyl-3-nortropanecarboxylate, which is an analgesic when tested in rats by standard procedures.

The 1-benzyl-2,5-bis(chloromethyl)pyrrolidine of this invention has also been found useful for conversion to 2,5-bis(chloromethyl)pyrrolidine. This debenzylation reaction is readily carried out, for example by catalytic hydrogenation in the presence of palladium-on-charcoal catalyst, using glacial acetic acid as a reaction medium.

The acid-addition salt forms of my new compound are useful not only as adrenergic blocking agents and as intermediates, as above-indicated, but are also useful for characterizing and identifying purposes, and in isolation or purification procedures. Moreover, the acid-addition salts are sources of the free base form, by reaction with alkali, and accordingly all of the acid-addition salts, regardless of considerations of solubility, toxicity, physical form, or the like of the particular acid-addition salt, are useful for the purposes of my invention. The acid moieties or anions in these salt forms are in themselves neither novel nor critical and therefore can be any acid anion or acid-like substance capable of salt formation with the free base form of 1-benzyl-2,5-bis(chloromethyl)pyrrolidine.

The acid-addition salts are prepared from any organic acid, inorganic acid (including organic acids having an inorganic group therein), or organo-metallic acid as exemplified by organic mono- and poly-carboxylic acids such as found, for example, in Beilstein's Organische Chemie, 4th ed., volumes III, IV, IX, X, XIV, XVII, XIX, XXI, XXII, and XXV; organic mono-and poly-sulfonic acid-sulfinic acids such as found, for example in Beilstein, volumes VI, XI, XVI, and XXII; organic phosphonic and phosphinic acids such as found, for example, in Beilstein, volumes XI and XVI; organic acids of arsenic and antimony such as found, for example, in Beilstein, volume XVI; organic heterocyclic carboxylic, sulfonic, and sulfinic acids such as found, for example in Beilstein, volumes XVIII, XXII, and XXV; acidic ion-exchange resins; and inorganic acids of any acid forming element or combination of elements such as found in Mellor, Comprehensive Treatise on Inorganic and Theoretical Chemistry, Longmans, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare the acid-addition salt forms of the compound of this invention. Thus there are also included acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al., Medicinal Chemistry, vol. IV, John Wiley and Sons, Inc., New York, N.Y. (1959). Also included as salt forming agents are so-called Lewis acids which lack a pair of electrons in the outer "electron shell" and react with basic compounds having an unshared pair of electrons to form salts, for example, boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicyclic acid, 3,5-dinitrobenzoic acid, anthranilic acid, cholic acid, 2-pyridinecarboxylic acid, 3-hydroxy-2-naphthoic acid, picric acid, quinic acid, tropic acid, 3-indoleacetic acid, barbituric acid, sulfamic acid, methanesulfonic acid, ethanesulfonic acid, isoethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the appropriate acid with the free base form of 1-benzyl-2,5-bis(chloromethyl)pyrrolidine or, when this is not appropriate, by dissolving the acid and the free base separately in suitable solvents and mixing the two solutions, or by dissolving both the acid and the free base together in a solvent. The resulting acid-addition salt is isolated by filtration, if it is insoluble in the reaction medium, or by evaporation of the reaction medium to leave the acid-addition salt as a residue.

It will be appreciated from the above that if one or more of the characteristics, such as solubility, molecular weight, physical appearance, toxicity, or the like of a given acid-addition salt of 1-benzyl-2,5-bis(chloromethyl)pyrrolidine render that salt unsuitable for the purpose at hand, it can be readily converted to another, more suitable form.

I claim:

1. A compound of the class consisting of 1-benzyl-2,5-bis(chloromethyl)pyrrolidine and acid-addition salts thereof.
2. 1-benzyl-2,5-bischloromethylpyrrolidine.
3. The hydrochloride of the compound of claim 2.

References Cited by the Examiner

UNITED STATES PATENTS 3,006,920  10/61  Boehme et al. _____ 260—313

OTHER REFERENCES

Cignarella et al., Gazetta Chim. Ital., vol. 90, pp. 1495–1502, November 1960.

NICHOLAS S. RIZZO, *Primary Examiner.*

IRVING MARCUS, DUVAL T. McCUTCHEN, WALTER A. MODANCE, *Examiners.*